(12) United States Patent
Weyerhaeuser et al.

(10) Patent No.: US 9,116,953 B2
(45) Date of Patent: *Aug. 25, 2015

(54) CALCULATION ENGINE WITH DYNAMIC PARTITIONING OF INTERMEDIATE RESULTS

(71) Applicants: Christoph Weyerhaeuser, Heidelberg (DE); Tobias Mindnich, Walldorf (DE); Daniel Baeumges, Viersen (DE); Johannes Merx, Heidelberg (DE)

(72) Inventors: Christoph Weyerhaeuser, Heidelberg (DE); Tobias Mindnich, Walldorf (DE); Daniel Baeumges, Viersen (DE); Johannes Merx, Heidelberg (DE)

(73) Assignee: SAP SE, Walldorf (DE)

( * ) Notice: Subject to any disclaimer, the term of this patent is extended or adjusted under 35 U.S.C. 154(b) by 107 days.

This patent is subject to a terminal disclaimer.

(21) Appl. No.: 13/896,984

(22) Filed: May 17, 2013

(65) Prior Publication Data

US 2014/0344244 A1    Nov. 20, 2014

(51) Int. Cl.
*G06F 17/30* (2006.01)

(52) U.S. Cl.
CPC ................. *G06F 17/30445* (2013.01)

(58) Field of Classification Search
USPC .................................. 707/706, 713
See application file for complete search history.

(56) References Cited

U.S. PATENT DOCUMENTS

| 5,742,840 | A | 4/1998 | Hansen et al. |
| 5,809,297 | A * | 9/1998 | Kroenke et al. ............ 1/1 |
| 6,889,141 | B2 * | 5/2005 | Li et al. ............... 702/2 |
| 7,536,432 | B2 | 5/2009 | Yamamoto |
| 7,571,192 | B2 * | 8/2009 | Gupta et al. ............ 1/1 |
| 7,577,637 | B2 | 8/2009 | Ghosh |
| 7,958,108 | B2 * | 6/2011 | Nishizawa et al. ........ 707/706 |
| 8,051,034 | B2 | 11/2011 | Mehta et al. |
| 8,060,544 | B2 | 11/2011 | Werner et al. |
| 8,095,532 | B2 * | 1/2012 | Treleaven ............. 707/713 |
| 8,122,385 | B2 * | 2/2012 | Fukuhara et al. .......... 716/50 |
| 8,160,977 | B2 * | 4/2012 | Poulin ................ 706/21 |
| 8,190,624 | B2 | 5/2012 | Duffy et al. |
| 8,195,643 | B2 * | 6/2012 | Weyerhaeuser et al. ...... 707/713 |
| 8,239,173 | B2 * | 8/2012 | Frohlich et al. ........... 703/1 |
| 8,280,876 | B2 * | 10/2012 | Ma et al. ............. 707/719 |
| 8,296,313 | B2 * | 10/2012 | Moestl ............. 707/765 |
| 8,352,775 | B1 | 1/2013 | Jain et al. |
| 8,365,198 | B2 | 1/2013 | Duffy |
| 8,381,224 | B2 | 2/2013 | Huetter et al. |
| 2010/0161569 | A1 | 6/2010 | Schreter |
| 2011/0276962 | A1 | 11/2011 | Chambers et al. |
| 2012/0005190 | A1 | 1/2012 | Faerber et al. |
| 2013/0125133 | A1 | 5/2013 | Schuster |

FOREIGN PATENT DOCUMENTS

EP       2469423 A1    6/2012

* cited by examiner

*Primary Examiner* — Kim Nguyen
(74) *Attorney, Agent, or Firm* — Mintz Levin Cohn Ferris Glovsky and Popeo, P.C.

(57) ABSTRACT

A query is received by a database server from a remote application server. The query is associated with a calculation model that defines a data flow model that includes a plurality of calculation nodes that each define one or more operations to execute on the database server. Thereafter, the database server dynamically determine, using at least one attribute of at least one dataset responsive to the query, that intermediate results provided by at least one of the operations specified by at least one of the nodes of the calculation model require partitioning. The database server then modifies the calculation model to partition operations on the at least one dataset based on the dynamic determination. The database server subsequently instantiates the modified calculation model so that it can be executed to generate at least one result set.

33 Claims, 5 Drawing Sheets

CALCULATION ENGINE WITH DYNAMIC PARTITIONING OF INTERMEDIATE RESULTS

TECHNICAL FIELD

The subject matter described herein relates to dynamically partitioning a query of a database calculation engine that uses a calculation model data flow graph.

BACKGROUND

Data flow between an application server and a database server is largely dependent on the scope and number of queries generated by the application server. Complex calculations can involve numerous queries of the database server which in turn can consume significant resources in connection with data transport as well as application server-side processing of transported data. In some cases, queries can be partitioned for execution in parallel. However, some conventional arrangements require that the parameters for such partitioning be static and defined during design-time. Such definitions do not always account for variations of incoming datasets, and as a result, efficient and reliable parallelization is not always possible.

SUMMARY

In one aspect, a query is received by a database server from a remote application server. The query is associated with a calculation model that defines a data flow model that includes a plurality of calculation nodes that each define one or more operations to execute on the database server. Thereafter, the database server dynamically determine, using at least one attribute of at least one dataset responsive to the query, that intermediate results provided by at least one of the operations specified by at least one of the nodes of the calculation model require partitioning. The database server then modifies the calculation model to partition operations on the at least one dataset based on the dynamic determination. The database server subsequently instantiates the modified calculation model so that it can be executed to generate at least one result set. Data can then be provided by the database server to the application server that includes the at least one result set.

The at least one attribute of the at least one dataset can be based on a variety of factors including, for example, a number of rows for the at least one dataset responsive to the query, a number of columns for the at least one dataset responsive to the query, a number of cells for the at least one dataset responsive to the query, an amount of memory consumed or estimated to be consumed by the at least one dataset responsive to the query.

The dynamic determination can be made, for example, by a model optimizer during run-time. The operations specified by the nodes can be executed by a model executor module. The calculation model can be instantiated in a calculation engine layer by a calculation engine. The calculation engine layer can interact with a physical table pool and a logical layer. The physical table pool can comprise physical tables containing data to be queried. The logical layer can define a logical metamodel joining at least a portion of the physical tables in the physical table, pool.

An input for each calculation node can include one or more of: a physical index, a join view, an OLAP view, and another calculation node. The calculation model can comprise database metadata. The calculation model can be exposed as a database calculation view.

A SQL processor can invoke a calculation engine to execute the calculation model behind the database calculation view. The calculation engine can invoke the SQL processor to executing set operations. The SQL processor can invoke the calculation engine when executing SQL queries with calculation views.

Computer program products are also described that comprise non-transitory computer readable media storing instructions, which when executed one or more data processors of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages. For example, the current subject matter is advantageous in that it provides dynamic parallelization based on definable characteristics of the incoming data. With such an arrangement, a calculation engine can provide a mechanism to leverage the resources of the database server in a more efficient and reliable manner. In particular, the current subject matter avoids the scenario in which there are too many parallel execution paths resulting in an overconsumption of CPU and memory resources of the database service as well as avoids the scenario in which the CPU and memory resources are underutilized.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
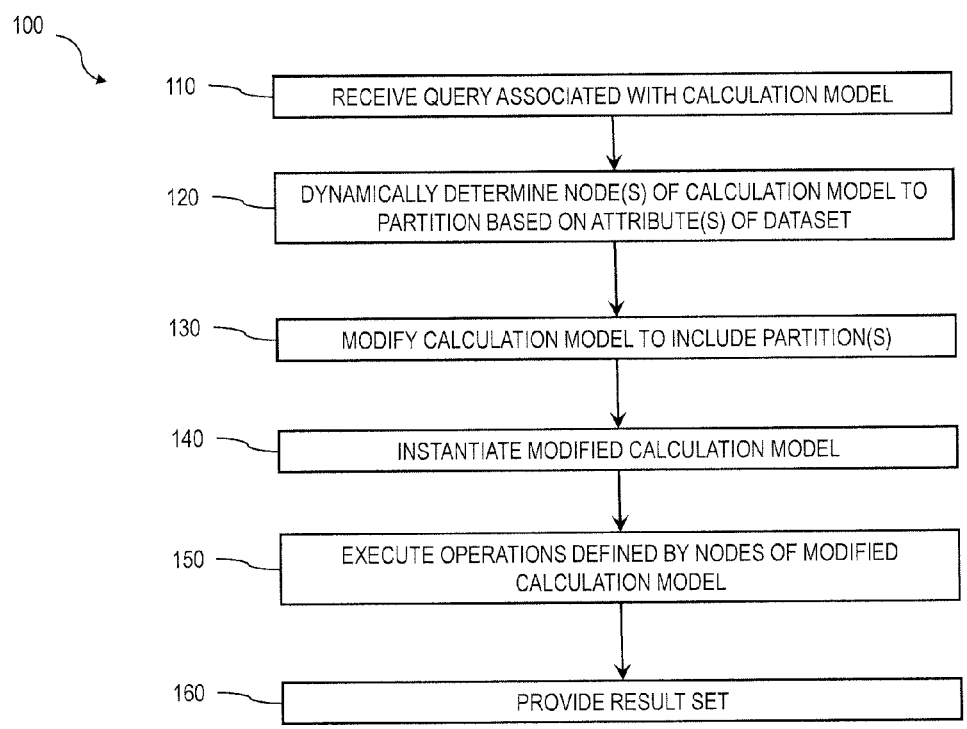
FIG. 1 is a process flow diagram illustrating a method of dynamically partitioning immediate results specified by a calculation model.

FIG. 1 is a process flow diagram 100 illustrating a method in which, at 110, a query is received by a database server from a remote application server. The query is associated with (e.g., specifies, etc.) a calculation model that defines a data flow model that includes a plurality of calculation nodes. Each calculation node defines one or more operations to execute on the database server. Thereafter, at 120, the database server dynamically determines using at least one attribute of at least one dataset responsive to the query, that intermediate results provided by at least one of the operations specified by at least one of the nodes of the calculation model require partitioning. At this point, the calculation model is modified, at 130, to partition operations on the at least one dataset based on the dynamic determination. The database server next, at 140, instantiates the modified calculation model so that at, 150, the operations defined by the calculation nodes of the modified calculation model are executed to result in at least one result set. The at least one result set is then provided, at 160, by the database server to the application server.

The subject matter described herein can enable an application developer to define a data flow model to push down a high level algorithm to a database. A developer can define a calculation scenario which describes this algorithm in a general way as data flow consisting of calculation nodes. A calculation node as used herein represents a operation such as a projection, aggregation, join, union, minus, intersection, and the like. Additionally, as described below, in addition to a specified operation, calculation nodes can sometimes be enhanced by filtering and/or sorting criteria. In some implementations, calculated attributes can also be added to calculation nodes.

During query time (i.e., the time in which a database is queried), the data flow specified by a calculation scenario is instantiated. During instantiation, the calculation scenario is compacted to only include queries requirements by removing useless pathes and attributes (that are not requested) within the calculation scenario. This compaction reduces calculation time and also minimizes the total amount of data that must be processed.

Figure 2:
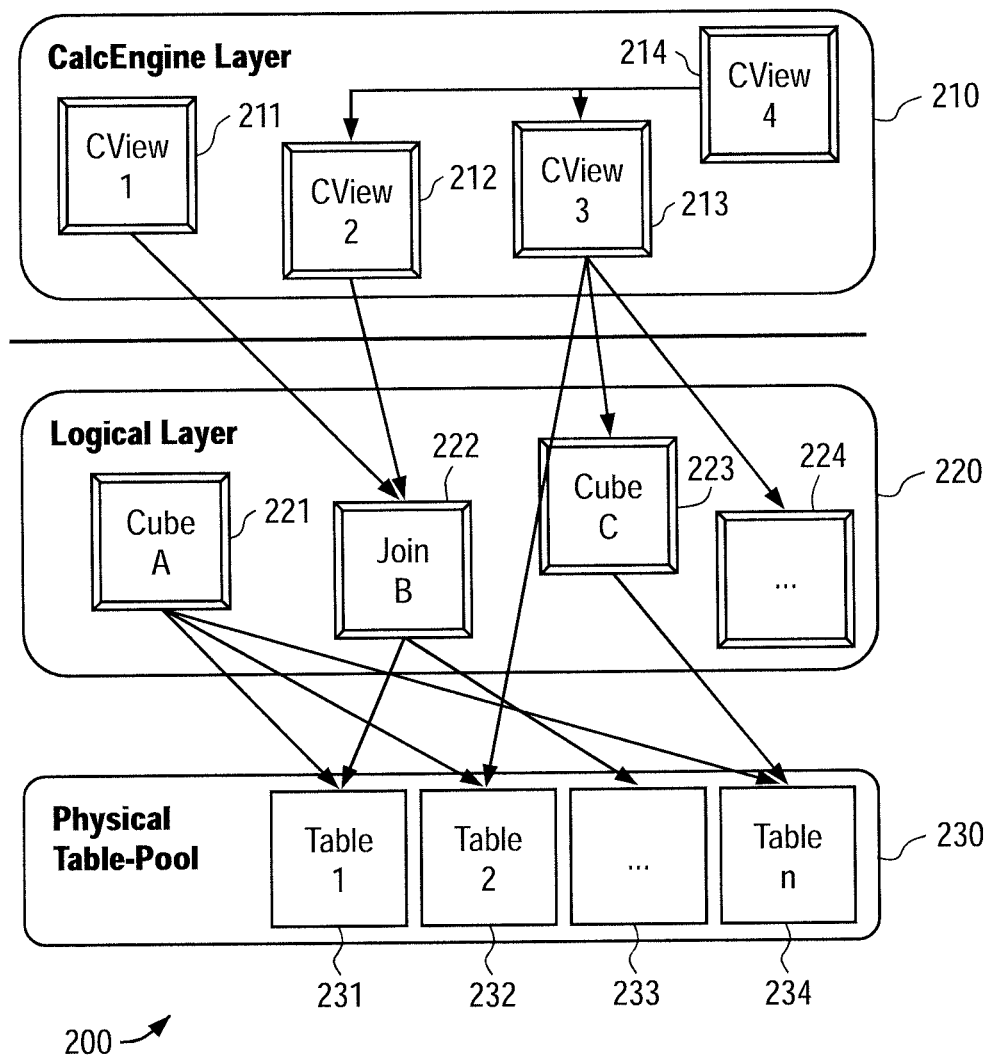
FIG. 2 is a diagram illustrating a calculation engine layer, a logical layer, a physical table pool and their interrelationship.

FIG. 2 is a diagram 200 that illustrates a database system in which there are three layers, a calculation engine layer 210, a logical layer 220, and a physical table-pool 230. Calculation scenarios can be executed by a calculation engine which can form part of a database or which can be part of the calculation engine layer 210 (which is associated with the database). The calculation engine layer 210 can be based on and/or interact with the other two layers, the logical layer 220 and the physical table pool 230. The basis of the physical table pool 230 consists of physical tables (called indexes) containing the data. Various tables can then be joined using logical meta-models defined by the logical layer 220 to form a new index. For example, the tables in a cube (OLAP view) can be assigned roles (e.g., fact or dimension tables) and joined to form a star schema. It is also possible to form join indexes, which can act like database view in environments such as the Fast Search Infrastructure (FSI) by SAP AG.

As stated above, calculation scenarios can include individual calculation nodes 211-214, which in turn each define operations such as joining various physical or logical indexes and other calculation nodes (e.g., CView 4 is a join of CView 2 and CView 3). That is, the input for a calculation node 211-214 can be one or more physical, join, or OLAP views or calculation nodes.

In calculation scenarios, two different representations can be provided. First, a pure calculation scenario in which all possible attributes are given. Second, an instantiated model that contains only the attributes requested in the query (and required for further calculations). Thus, calculation scenarios can be created that can be used for various queries. With such an arrangement, calculation scenarios can be created which can be reused by multiple queries even if such queries do not require every attribute specified by the calculation scenario.

Every calculation scenario can be uniquely identifiable by a name (i.e., the calculation scenario can be a database object with a unique identifier, etc.). This means, that the calculation scenario can be queried in a manner similar to a view in a SQL database. Thus, the query is forwarded to the calculation node 211-214 for the calculation scenario that is marked as the corresponding default node. In addition, a query can be executed on a particular calculation node 211-214 (as specified in the query). Furthermore, nested calculation scenarios can be generated in which one calculation scenario is used as source in another calculation scenario (via a calculation node 211-214 in this calculation scenario). Each calculation node 211-214 can have one or more output tables. One output table can be consumed by several calculation nodes 211-214.

Further details regarding calculation engine architecture and calculation scenarios can be found in U.S. Pat. No. 8,195,643, the contents of which are hereby fully incorporated by reference.

Figure 3:
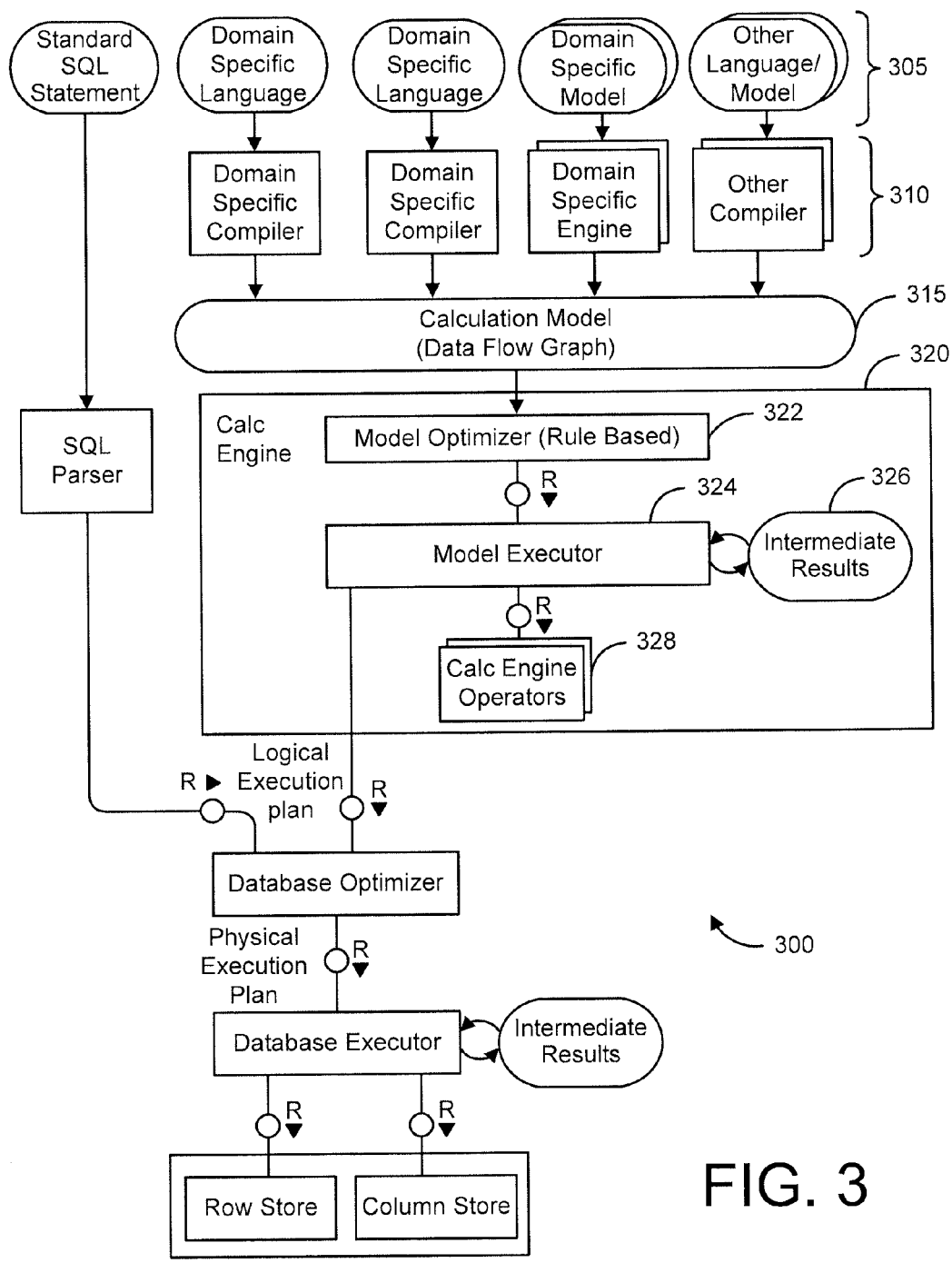
FIG. 3 is a diagram illustrating an architecture for processing and execution control.

FIG. 3 is a diagram 300 illustrating a sample architecture for request processing and execution control. As shown in FIG. 3, artifacts 305 in different domain specific languages can be translated by their specific compilers 310 into a common representation called a "calculation scenario" 315 (illustrated as a calculation model). To achieve enhanced performance, the models and programs written in these languages are executed inside the database server. This arrangement eliminates the need to transfer large amounts of data between the database server and the client application. Once the different artifacts 305 are compiled into this calculation scenario 315, they can be processed and executed in the same manner. The execution of the calculation scenarios 315 is the task of a calculation engine 320.

The calculation scenario 315 can be a directed acyclic graph with arrows representing data flows and nodes that represent operations. Each calculation node has a set of inputs and outputs and an operation that transforms the inputs into the outputs. In addition to their primary operation, each calculation node can also have a filter condition for filtering the result set. The inputs and the outputs of the operations can be table valued parameters (i.e., user-defined table types that are passed into a procedure or function and provide an efficient way to pass multiple rows of data to the application server). Inputs can be connected to tables or to the outputs of other calculation nodes. Calculation scenarios 315 can support a variety of node types such as (i) nodes for set operations such as projection, aggregation, join, union, minus, intersection, and (ii) SQL nodes that execute a SQL statement which is an attribute of the node. In addition, to enable parallel execution, a calculation scenario 315 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result he or she can use a split. Then, the nodes can be automatically multiplied between split and merge and partition the data.

A calculation scenario 315 can be defined as part of database metadata and invoked multiple times. A calculation scenario 315 can be created, for example, by a SQL statement "CREATE CALCULATION SCENARIO<NAME> USING<XML or JSON>". Once a calculation scenario 315 is created, it can be queried (e.g., "SELECT A, B, C FROM<scenario name>", etc.). In some cases, databases can have pre-defined calculation scenarios 315 (default, previously defined by users, etc.). The calculation scenarios 315 can be persisted in a repository (coupled to the database server) or in transient scenarios, the calculation scenarios 315 can be kept in-memory.

Calculation scenarios 315 are more powerful than traditional SQL queries or SQL views for many reasons. One reason is the possibility to define parameterized calculation schemas that are specialized when the actual query is issued. Unlike a SQL view, a calculation scenario 315 does not describe the actual query to be executed. Rather, it describes the structure of the calculation. Further information is supplied when the calculation scenario is executed. This further information can include parameters that represent values (for example in filter conditions). To obtain more flexibility, it is also possible to refine the operations when the model is invoked. For example, at definition time, the calculation scenario 315 may contain an aggregation node containing all attributes. Later, the attributes for grouping can be supplied with the query. This allows having a predefined generic aggregation, with the actual aggregation dimensions supplied at invocation time. The calculation engine 320 can use the actual parameters, attribute list, grouping attributes, and the like supplied with the invocation to instantiate a query specific calculation scenario 315. This instantiated calculation scenario 315 is optimized for the actual query and does not contain attributes, nodes or data flows that are not needed for the specific invocation.

When the calculation engine 320 gets a request to execute a calculation scenario 315, it can first optimize the calculation scenario 315 using a rule based model optimizer 322. Examples for optimizations performed by the model optimizer can include "pushing down" filters and projections so that intermediate results 326 are narrowed down earlier, or the combination of multiple aggregation and join operations into one node. The optimized model can then be executed by a calculation engine model executor 324 (a similar or the same model executor can be used by the database directly in some cases). This includes decisions about parallel execution of operations in the calculation scenario 315. The model executor 324 can invoke the required operators (using, for example, a calculation engine operators module 328) and manage intermediate results. Most of the operators are executed directly in the calculation engine 320 (e.g., creating the union of several intermediate results). The remaining nodes of the calculation scenario 315 (not implemented in the calculation engine 320) can be transformed by the model executor 324 into a set of logical database execution plans. Multiple set operation nodes can be combined into one logical database execution plan if possible.

The calculation scenarios 315 of the calculation engine 320 can be exposed as a special type of database views called calculation views. That means a calculation view can be used in SQL queries and calculation views can be combined with tables and standard views using joins and sub queries. When such a query is executed, the database executor inside the SQL processor needs to invoke the calculation engine 320 to execute the calculation scenario 315 behind the calculation view. In some implementations, the calculation engine 320 and the SQL processor are calling each other: on one hand the calculation engine 320 invokes the SQL processor for executing set operations and SQL nodes and, on the other hand, the SQL processor invokes the calculation engine 320 when executing SQL queries with calculation views.

The model optimizer 322 can be configured to enable dynamic partitioning based on one or more aspects of a query and/or datasets used by queries. The model optimizer can implement a series of rules that are triggered based on attributes of incoming datasets exceeding specified thresholds. Such rules can, for example, apply thresholds each with a corresponding a parallelization factor. For example, if the incoming dataset has 1 million rows then two partitions (e.g., parallel jobs, etc.) can be implemented, or if the incoming dataset has five million rows then five partitions (e.g., parallel jobs, etc.) can be implemented, and the like.

The attributes of the incoming datasets utilized by the rules of model optimizer 322 can additionally or alternatively be based on an estimated and/or actual amount of memory consumed by the dataset, a number of rows and/or columns in the dataset, and the number of cell values for the dataset, and the like.

Figure 4:
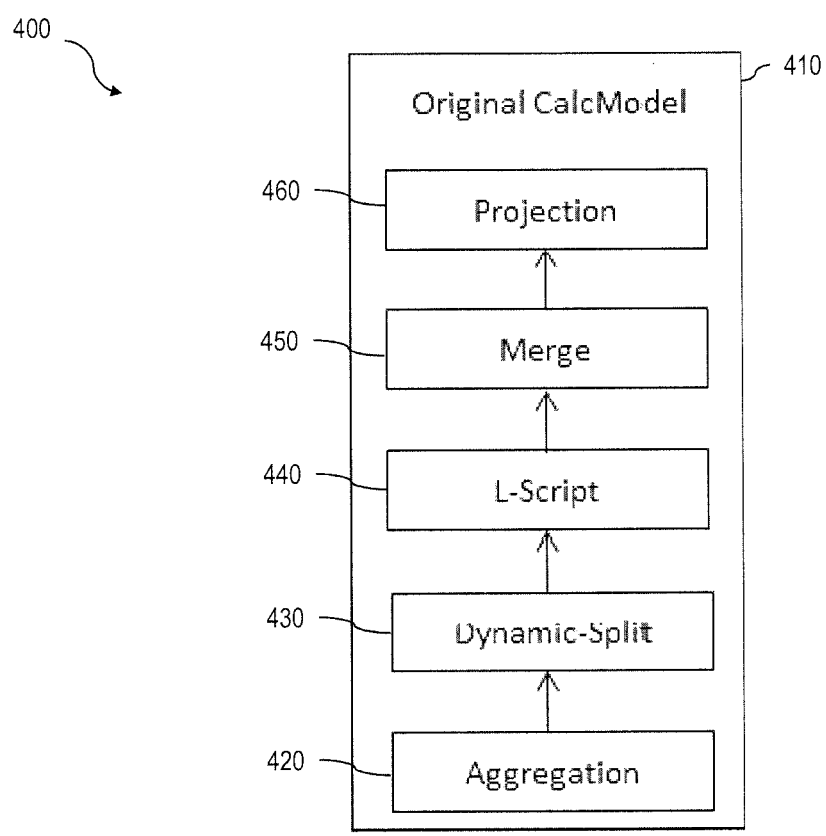
FIG. 4 is a diagram illustrating a calculation model prior to partitioning.

FIG. 4 is a diagram 400 showing a logical arrangement of a calculation model 410 created by a user. As noted, there are five main operations, an aggregation 420 operation, a dynamic split operation 430, an L-script operation 440, a merge operation 450, and a projection operation 460. Each of these operations 420-460 can correspond to one or more nodes of a calculation scenario.

Figure 5:
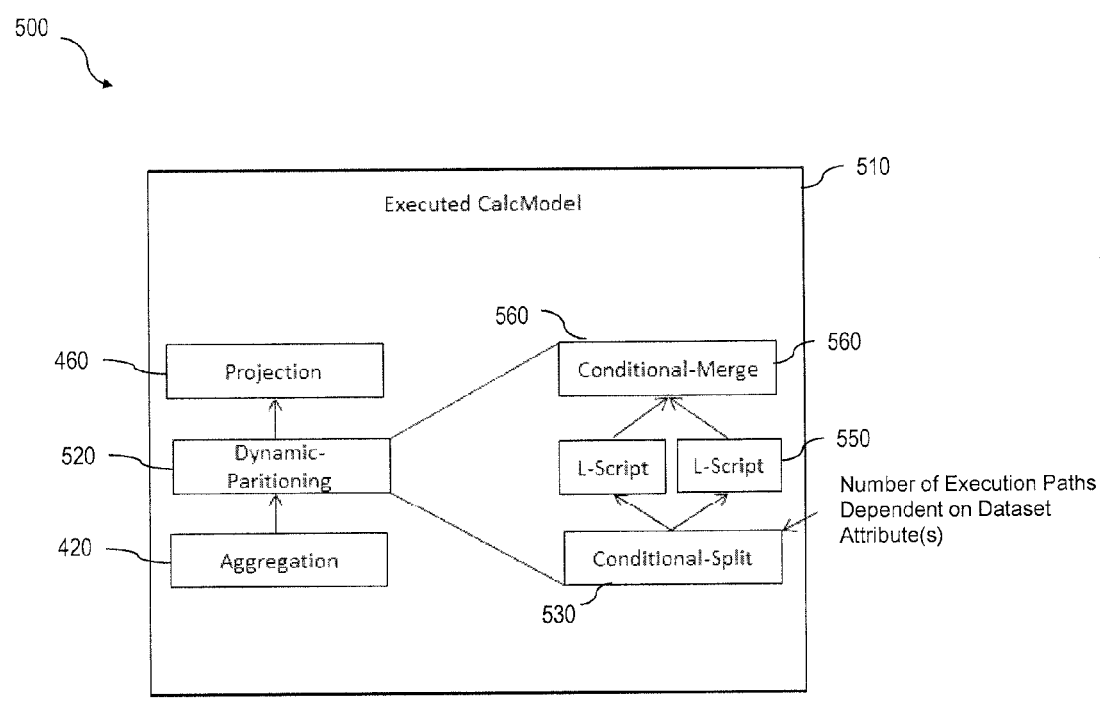
FIG. 5 is a diagram illustrating the calculation model of FIG. 4 after partitioning.

The model optimizer 322, using the rules above, can optimize the calculation model for execution. The executed calculation model 510 is illustrated in the diagram 500 of FIG. 5. During execution of a calculation model, the sequence of calculation operations (subplan) that will be executed in parallel can be passed to the model executor 324. This model executor 324 can consume the incoming datasets (that are generated by the partitions) and build parallel execution paths based on the threshold defined in the dynamic split operation so that the parallel execution plan can be executed.

The execution calculation model 510 includes two operations from the calculation model 420 and 460, namely the aggregation operation and the projection operation 460. The model optimizer 322 when generating the execution calculation model 510 made no changes with regard to these aspects of the calculation model 410 of FIG. 4. During execution, when the aggregation 420 is processed and it comes to the dynamic split 520, the data is dynamically partitioned (by the model optimizer 322 during run-time and using a pre-defined calculation model with user-defined thresholds/partitioning criterion) based on the incoming data and on the dynamic split criterion. Depending on the number of partitions, the same number of L-Script nodes (550) can be created to enforce a parallel execution. Subsequently, the partitions are merged as part of a conditional merge operation 560 and the processing by the projection operation 460 can be on one single intermediate result.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method comprising:
    receiving, by a database server from a remote application server, a query associated with a calculation model that defines a data flow model that includes a plurality of calculation nodes, each calculation node defining one or more operations to execute on the database server;
    dynamically determining, by the database server using at least one attribute of at least one dataset responsive to the query, that intermediate results provided by at least one of the operations specified by at least one of the nodes of the calculation model require partitioning;
    modifying, by the database server, the calculation model to partition operations on the at least one dataset based on the dynamic determination;
    instantiating, by the database server, the modified calculation model;
    executing, by the database server, the operations defined by the calculation nodes of the modified calculation model to result in at least one result set; and
    providing, by the database server to the application server, the at least one result set; and
    wherein the at least one attribute of the at least one dataset used as part of the dynamic partitioning is based on at least one structural attribute for the at least one dataset responsive to the query.

2. A method as in claim 1, wherein the at least one structural attribute is based on a number of rows for the at least one dataset responsive to the query.

3. A method as in claim 1, wherein the at least one structural attribute is based on a number of columns for the at least one dataset responsive to the query.

4. A method as in claim 1, wherein the at least one structural attribute is based on a number of cells for the at least one dataset responsive to the query.

5. A method as in claim 1, wherein the at least one attribute of the at least one dataset used as part of the dynamic partitioning is further based on an amount of memory consumed or estimated to be consumed by the at least one dataset responsive to the query.

6. A method as in claim 1, wherein the dynamic determination is made by a model optimizer during run-time.

7. A method as in claim 1, wherein the operations are executed by a model executor module.

8. A method as in claim 1, wherein the calculation model is instantiated in a calculation engine layer by a calculation engine.

9. A method as in claim 8, wherein the calculation engine layer interacts with a physical table pool and a logical layer, the physical table pool comprising physical tables containing data to be queried, and the logical layer defining a logical metamodel joining at least a portion of the physical tables in the physical table pool.

10. A method as in claim 1, wherein an input for each calculation node comprises one or more of: a physical index, a join index, an OLAP index, and another calculation node.

11. A method as in claim 1, wherein the calculation model comprises database metadata.

12. A method as in claim 1, wherein the calculation model is exposed as a database calculation view.

13. A method as in claim 12, wherein the executing comprises:
invoking, by a SQL processor, a calculation engine to execute the calculation model behind the database calculation view.

14. A method as in claim 13, wherein the calculation engine invokes the SQL processor for executing set operations.

15. A method as in claim 14, wherein the SQL processor invokes the calculation engine when executing SQL queries with calculation views.

16. A non-transitory computer program product storing instructions, which when executed by at least one data processor of at least one computer system, result in operations comprising:
receiving a query associated with a calculation model that defines a data flow model that includes a plurality of calculation nodes, each calculation node defining one or more operations to execute on the database server;
dynamically determining, using at least one attribute of at least one dataset responsive to the query, that intermediate results provided by at least one of the operations specified by at least one of the nodes of the calculation model require partitioning;
modifying the calculation model to partition operations on the at least one dataset based on the dynamic determination;
instantiating the modified calculation model;
executing the operations defined by the calculation nodes of the modified calculation model to result in at least one result set; and
providing the at least one result set;
wherein the at least one attribute of the at least one dataset used as part of the dynamic partitioning is based on an amount of memory consumed by the at least one dataset responsive to the query.

17. A computer program product as in claim 16, wherein the at least one attribute of the at least one dataset is further based on an attribute selected from a group consisting of: a number of rows for the at least one dataset responsive to the query, a number of columns for the at least one dataset responsive to the query, a number of cells for the at least one dataset responsive to the query, and an amount of memory estimated to be consumed by the at least one dataset responsive to the query.

18. A computer program product as in claim 16, wherein:
the executing comprises invoking, by a SQL processor, a calculation engine to execute the calculation model behind the database calculation view;
the calculation engine invokes the SQL processor for executing set operations; and
the SQL processor invokes the calculation engine when executing SQL queries with calculation views.

19. A system comprising:
a database server comprising at least one data processor; and
an application server remote from the database server comprising at least one data processor; and
wherein the database server:
receives a query from the application server, the query being associated with a calculation model that defines a data flow model that includes a plurality of calculation nodes, each calculation node defining one or more operations to execute on the database server;
dynamically determines, using at least one attribute of at least one dataset responsive to the query, that intermediate results provided by at least one of the operations specified by at least one of the nodes of the calculation model require partitioning;
modifies the calculation model to partition operations on the at least one dataset based on the dynamic determination;
instantiates the modified calculation model;
executes the operations defined by the calculation nodes of the modified calculation model to result in at least one result set; and
provides the at least one result set to the application server;
wherein the at least one attribute of the at least one dataset used as part of the dynamic partitioning is based on an amount of memory estimated to be consumed by the at least one dataset responsive to the query.

20. A system as in claim 19, wherein the at least one attribute of the at least one dataset is based on a number of rows for the at least one dataset responsive to the query.

21. A system as in claim 19, wherein the at least one structural attribute is based on a number of columns for the at least one dataset responsive to the query.

22. A system as in claim 19, wherein the at least one structural attribute is based on a number of cells for the at least one dataset responsive to the query.

23. A system as in claim 19, wherein the at least one attribute of the at least one dataset used as part of the dynamic partitioning is further based on an amount of memory consumed or estimated to be consumed by the at least one dataset responsive to the query.

24. A system as in claim 19, wherein the dynamic determination is made by a model optimizer during run-time.

25. A system as in claim 19, wherein the operations are executed by a model executor module.

26. A system as in claim 19, wherein the calculation model is instantiated in a calculation engine layer by a calculation engine.

27. A system as in claim 26, wherein the calculation engine layer interacts with a physical table pool and a logical layer, the physical table pool comprising physical tables containing data to be queried, and the logical layer defining a logical metamodel joining at least a portion of the physical tables in the physical table pool.

28. A system as in claim 19, wherein an input for each calculation node comprises one or more of: a physical index, a join index, an OLAP index, and another calculation node.

29. A system as in claim 19, wherein the calculation model comprises database metadata.

30. A system as in claim 19, wherein the calculation model is exposed as a database calculation view.

31. A system as in claim 30, wherein the executing comprises:
invoking, by a SQL processor, a calculation engine to execute the calculation model behind the database calculation view.

32. A system as in claim 31, wherein the calculation engine invokes the SQL processor for executing set operations.

33. A system as in claim 32, wherein the SQL processor invokes the calculation engine when executing SQL queries with calculation views.

* * * * *